US011348385B2

(12) United States Patent
Park et al.

(10) Patent No.: US 11,348,385 B2
(45) Date of Patent: May 31, 2022

(54) METHOD AND SYSTEM FOR MANAGING EVENT DATA

(71) Applicants: Hyundai Motor Company, Seoul (KR); Kia Motors Corporation, Seoul (KR)

(72) Inventors: Seung Wook Park, Gyeonggi-Do (KR); Wha Pyeong Lim, Gyeonggi-Do (KR); Jung Hei Ryu, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 95 days.

(21) Appl. No.: 16/675,751

(22) Filed: Nov. 6, 2019

(65) Prior Publication Data

US 2020/0175788 A1 Jun. 4, 2020

(30) Foreign Application Priority Data

Nov. 7, 2018 (KR) ........................ 10-2018-0135708
Jan. 9, 2019 (KR) ........................ 10-2019-0002897

(51) Int. Cl.
*G07C 5/08* (2006.01)
*G06F 21/60* (2013.01)
*G07C 5/00* (2006.01)

(52) U.S. Cl.
CPC ............. *G07C 5/085* (2013.01); *G07C 5/008* (2013.01); *G07C 5/0816* (2013.01)

(58) Field of Classification Search
USPC ........................................................ 701/33.4
See application file for complete search history.

(56) References Cited

U.S. PATENT DOCUMENTS 9,196,157 B2 * 11/2015 Hardin .................. H04W 4/029
9,201,843 B2 * 12/2015 Suganuma ............. G01C 21/00
2004/0267410 A1 * 12/2004 Duri .................... G06F 21/6245 701/1
2008/0147267 A1 * 6/2008 Plante .................... G07C 5/008 701/33.4
2014/0379169 A1 * 12/2014 Camacho ................ H04L 67/02 701/2
2016/0050356 A1 * 2/2016 Nalepka ............. G06K 9/00791 348/148
2016/0117871 A1 * 4/2016 McClellan ............. G07C 5/008 701/31.5
2019/0295333 A1 * 9/2019 Nista ................... B60R 16/0234
2020/0175788 A1 * 6/2020 Park ..................... G07C 5/0816

* cited by examiner

*Primary Examiner* — Tyler D Paige
(74) *Attorney, Agent, or Firm* — Mintz Levin Cohn Ferris Glovsky and Popeo, P.C.; Peter F. Corless

(57) ABSTRACT

A centralized event data management system for collecting event data from a plurality of vehicles and managing thereof is disclosed. The centralized system liberates the vehicle onboard event data recorder (EDR) from the constraints of data storage space. Free of the constraints of data storage space, the EDR allows for more flexible data collection than is mandated by law or regulation.

20 Claims, 5 Drawing Sheets

METHOD AND SYSTEM FOR MANAGING EVENT DATA

CROSS-REFERENCE TO RELATED APPLICATIONS

The present application is based on, and claims priority from, Korean Patent Application Number 10-2018-0135708, filed Nov. 7, 2018, the disclosure of which is incorporated by reference herein in its entirety.

TECHNICAL FIELD

The present disclosure generally relates to collecting and managing event data generated in multiple vehicles.

BACKGROUND

The statements in this section merely provide background information related to the present disclosure and do not necessarily constitute prior art. In general, an event data recorder (EDR) is configured to detect an accident or such event and store information about a driving state of a vehicle or an operation by a driver within a predetermined time before and after the event. At least several parameters, including speed, seat belt status, and airbag deployment status, are stored for reconstruction during forensic investigations.

Forensic investigation is generally performed using a vehicle diagnostic link connector, e.g., an on-board computer (OBD)-II port or by physically extracting an EDR data memory and reading data therefrom. Data in the EDR is susceptible to damage or alteration due to faulty reading technology and may be maliciously manipulated or deleted after storing, which exhibits the difficulty of ensuring complete data integrity for the stored data.

In general, measurement data from various onboard sensors is temporarily stored in a volatile memory of the EDR as data for a certain period of time is continuously updated. At the occurrence of an event (e.g., airbag deployment) under certain preprogrammed conditions occurs, a nonvolatile memory of the EDR is written with the temporarily stored data for 5 seconds before the collision or for 0.2 to 0.3 seconds after the collision. Therefore, data of a minor incident that do not meet the preset conditions of event may be overwritten with new data in the volatile memory. Even though minor incidents account for a significant portion of the overall insured accidents, such EDR data recording method as above due to limited storage space makes it difficult for the investigators to utilize the EDR data related to minor incidents.

Meanwhile, the investigators of government agencies or private organizations, such as insurance companies and vehicle manufacturers work to investigate the circumstances surrounding a traffic event (e.g., traffic accident) by identifying and tracking specific data sources (e.g., accident vehicles) and independently gathering necessary information from each data source to identify the cause, defect, aggravation factors, and relaxation factors of the accident. Such information may include data in EDRs. Unfortunately, collecting information in this manner consumes a substantial amount of effort and time. Furthermore, some data sources may not be identified or may no longer be usable when identified, or may have already been deleted.

Therefore, there is a need for a centralized system and related method for collecting and managing the data recorded in the event data recorder of the vehicle to be capable of identifying the data source having a data on the traffic event and obtaining such data in a timely manner.

SUMMARY

The present disclosure provides a centralized event data management system that protects an individual's privacy. In addition, the present disclosure provides techniques for changing what data elements to collect and maintain from a vehicle in response to a change request of the vehicle holder (e.g., a vehicle owner, lease holder, etc.), by changes in law or regulation, and/or depending on the current location of the vehicle (i.e., the country where the vehicle currently resides).

According to at least one aspect of the disclosure, a method, which is performed by an event data management system implemented by at least one networked server for collecting and managing event data from at least one vehicle, may include receiving from a requester an update request for at least one event data recorder (EDR) rule that defines an operation of an EDR mounted within the at least one vehicle, generating at least one EDR rule that is suitable for the EDR and an associated electronic controller (e.g., ECU) of the at least one vehicle based on the update request, and providing the vehicle with an update of at least one generated EDR rule. The associated electronic controller may include an electronic controller configured to provide the EDR with a trigger signal providing a notification regarding an occurrence of an event, or an electronic controller configured to generate data to be recorded by the EDR.

Exemplary embodiments of the method may further include one or more of the following features. In some embodiments, the update request includes a request for changing, deleting or adding decision criteria to determine an occurrence of at least one event that triggers the EDR to record event data. In some embodiments, the newly generated EDR rule includes a first decision criterion mandated by a law or a regulation, and a second decision criterion, different from the first decision criterion, added by a setting of the requestor. The second decision criterion may be a relaxed criterion compared to the first decision criterion.

The generated EDR rule includes a rule that defines data elements to be recorded upon an occurrence of at least one event, the data elements including a first element mandated by law or regulation and a second element added by a setting of the requestor. The method of collecting and managing event data from at least one vehicle further includes receiving an event data record made based on the EDR rule by the EDR mounted on the vehicle, and storing the event data record in a database. The event data record when stored may be classified by EDR rules or trigger conditions applied to making of the event data record.

Another aspect of the present disclosure provides a system for management of event data, which is implemented by at least one networked server for collecting and managing the event data from a plurality of vehicles. The event data management system includes a device (e.g. controller) configured to receive from a requester an update request for at least one event data recorder (EDR) rule that defines an operation of an EDR mounted within each of the vehicles, a device configured to generate at least one EDR rule that is suitable for the EDR and an associated electronic controller of each vehicle based on the update request, and a device configured to provide each of the vehicles with an update of a generated EDR rule.

Yet another aspect of the present disclosure provides a method of operating at least one vehicle having an event data recorder (EDR). The method may include requesting an event data management system implemented by at least one networked server for at least one EDR rule suitable for a country in which the at least one vehicle is located. The method further includes obtaining an update of at least one EDR rule that is suitable for the country in which the at least one vehicle is located, and applying the at least one EDR rule to the EDR and an associated electronic controller.

Exemplary embodiments of the method of operating at least one vehicle may further include one or more of the following features. In some embodiments, the method of operating at least one vehicle further includes determining whether the at least one vehicle is relocated from one country to a new country. The requesting includes providing a notification that the event data management system of a current location of the vehicle or the country in which the at least one vehicle is currently located. The at least one EDR rule includes a decision criterion for determining an occurrence of at least one event triggering the EDR to record event data. In some embodiments, the at least one EDR rule include a rule that defines data elements to be recorded upon an occurrence of at least one event.

Yet another aspect of the present disclosure provides an onboard monitoring system of a vehicle having an event data recorder (EDR), which may include a device configured to request an event data management system implemented by at least one networked server for at least one EDR rule suitable for a country in which the vehicle is located, and a device configured to obtain an update of at least one EDR rule that is suitable for the country in which the vehicle is located, and to apply the at least one EDR rule to the EDR and an associated electronic controller.

According to at least one aspect of the disclosure, the event data records in the respective vehicles are stored and managed in databases in a network. To protect the privacy of individuals, vehicle identification information is isolated from the event data, which otherwise allows a third party to identify or track the associated vehicle. The isolated vehicle identification information and event data are managed respectively in different databases. No database stores event data and associated vehicle identification information.

According to another aspect of the present disclosure, an individual or organization may obtain data related to the event of interest at the right time by searching a network database in which the event data is stored. In addition, event data stored in a repository on a trusted network may be useful for forensic investigations that require guaranteed integrity of event data. Yet another aspect of the present disclosure enables the use of event data related to minor accidents involving no airbag deployment, which otherwise could be overwritten in the prior art with new event data.

In accordance with yet another aspect of the present disclosure, vehicle owners may select the trigger conditions for a vehicle EDR to store/upload data, to store/upload which data elements among other tasks. Additionally, according to change of the country where the vehicle resides, a new set of EDR rules may be applied to the onboard EDR as appropriate to that country.

DETAILED DESCRIPTION

Figure 1:
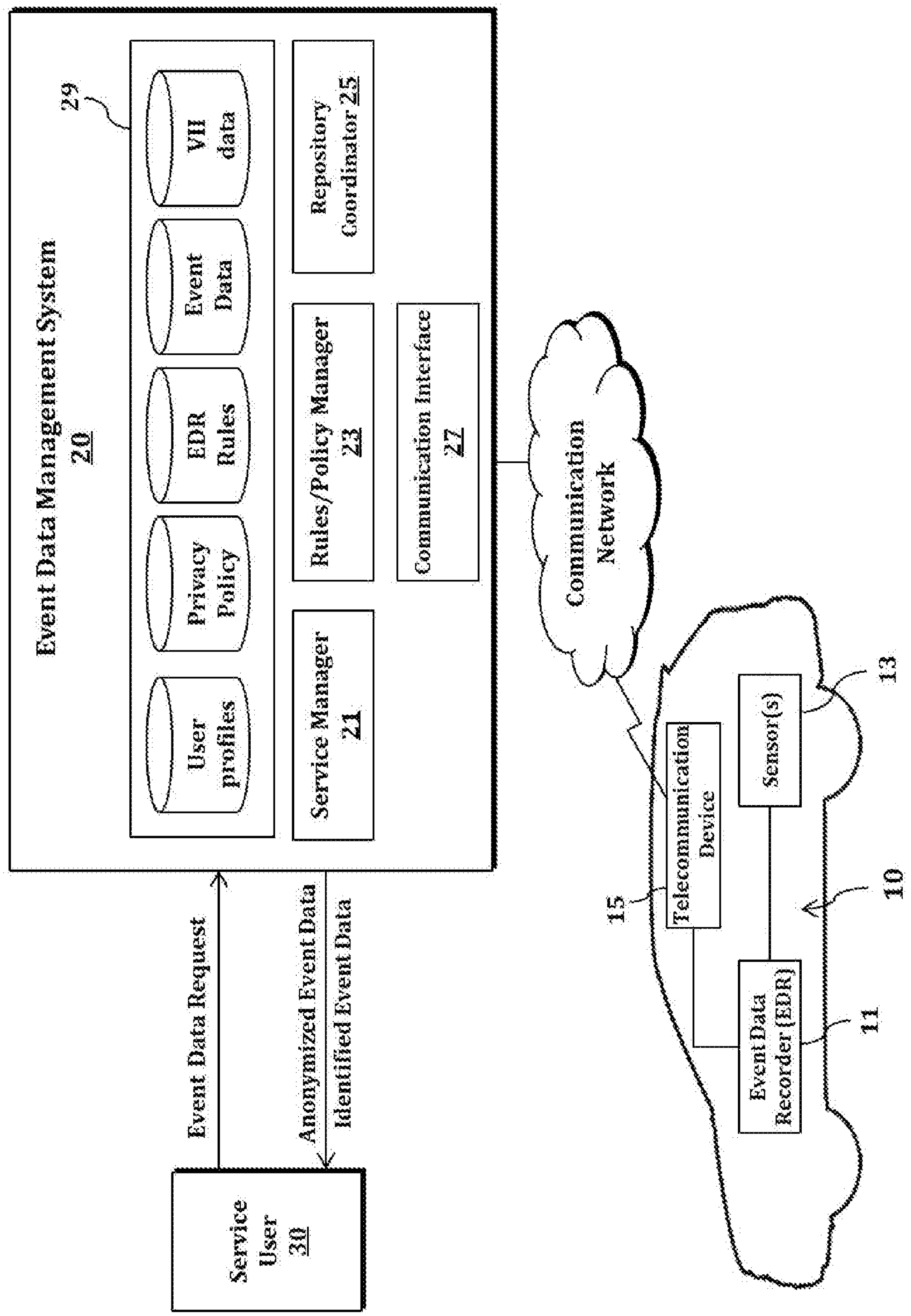
FIG. 1 is a schematic diagram of a centralized system for collecting and managing event data from vehicles in accordance with at least one exemplary embodiment of the present disclosure.

Hereinafter, some exemplary embodiments of the present disclosure will be described in detail through exemplary drawings. In the following description, like reference numerals would rather designate like elements, although the elements are shown in different drawings. Further, in the following description of the at least one embodiment, a detailed description of known functions and configurations incorporated herein will be omitted for the purpose of clarity and for brevity.

Additionally, various terms such as first, second, A, B, (a), (b), etc., are used solely for the purpose of differentiating one component from the other but not to imply or suggest the substances, the order or sequence of the components. Throughout this specification, when a part “includes” or “comprises” a component, the part is meant to further include other components, not excluding thereof unless there is a particular description contrary thereto. Further, the terms such as “unit”, “module”, and the like refer to units for processing at least one function or operation, which may be implemented by hardware, software, or a combination thereof.

FIG. 1 is a schematic diagram of a centralized system for collecting and managing event data from vehicles in accordance with at least one exemplary embodiment of the present disclosure. The centralized system 100 includes an onboard monitoring system 10 provided in each of one or more vehicles and an event data management system 20 which is implemented by one or more servers on a network. The server(s) that implements the event data management system 20 may be a server(s) operated by vehicle manufacturers or a neutral server operated by service companies that offer event data management services.

The onboard monitoring system 10 may record data relating to the driving state of the vehicle, the operation by the driver, and the like within a predetermined time before and after an event occurrence time. The onboard monitoring system 10 may wirelessly transmit the recorded data to the event data management system 20 on the network. The onboard monitoring system 10 may include an event data recorder (EDR) 11, at least one sensor 13, and a telecommunication device 15. These components may be connected to a vehicle data bus, for example, a controller area network (CAN), a local interconnect network (LIN), a medium oriented systems transport (MOST), Ethernet, etc.

The EDR 11 may be configured to receive data from various sensors and/or electronic control units (ECUs) mounted within the vehicle. In the volatile memory of the EDR 11, data for a predetermined time are temporarily stored while being constantly updated. The EDR 11 is designed to be responsive to a detection of one or more predefined events occurred for causing its internal nonvolatile memory to record the data that has been stored in the volatile memory within a predetermined time before and after the detection, and for providing the recorded data to the telecommunication device 15. This function or operation of the EDR 11 may be implemented by a preset EDR rule set. The event as in the event data recorder may particularly be a traffic collision.

Traffic collisions may be detected, for example, when the deployment of an irreversible safety device, such as an airbag or seatbelt preloading device, is triggered. Traffic collisions may be also detected upon detection of the occurrence of an acceleration or deceleration exceeding a predefined threshold (e.g., speed change of 8 km/h or more within 150 ms). The event may further include a failure of the vehicle's primary function. The EDR 11 may be configured to receive trigger signal(s) indicating the occurrence of an event from, for example, an electronic control unit(s), such as, an airbag control unit (ACU). A plurality of different trigger signals may be distinguished by a unique identifier assigned to each trigger signal. The EDR 11 may be accessible to the values measured by the at least one sensor 13.

The at least one sensor 13 may be designed to detect vehicle speed/acceleration or deceleration/travel distance and the like. Data recorded by the EDR 11 may be, for example, an appropriate data to help track a traffic collision, such as vehicle dynamics, the behavior of the driver, the operating state of the safety system of the vehicle. The EDR 11 provides the recorded data (hereinafter referred to as "EDR data") to the telecommunication device 15. The EDR data may include or be stored with a unique identifier of the trigger signal that triggered the recording.

In response to receiving EDR data from the EDR 11, the telecommunication device 15 may be configured to obtain the data, time, and geographical location of the event occurred from a positioning device (not shown), a time determining device (not shown), and the like. The positioning device may include a receiver be configured to receive geographic location information and/or time information from a satellite assisted positioning system such as a global positioning system (GPS), a global navigation satellite system (GNSS), or the like. The telecommunication device 15 may be configured to include a positioning device and/or a time determining device. Alternatively, the date on which the event occurred EDR data itself to be recorded by the EDR 11 may contain the date, time (i.e., time stamp), and geographic location of the event occurred.

The telecommunication device 15 is wired or wireless communication equipment for linking the vehicle internal network with an external communication network. The telecommunication device 15 may be, for example, a telematics unit (TMU), or a wired or wireless dongle plugged into the OBD-II port. The telecommunication device 15 may be configured to include a wireless transceiver capable of, for example, cellular communication such as GSM/WCDMA/LTE/5G or short range wireless communication such as WLAN, c-V2X, WAVE, DSRC, Bluetooth, etc.

The telecommunication device 15 may be configured to generate an event report message upon receiving the EDR data from the EDR 11. The telecommunication device 15 may be configured to transmit the event report message via the communications network to the event data management system 20. The event report message may include Vehicle Identifiable Information (VII) and EDR data received from the EDR 11. Particularly, the vehicle identification information is information capable of uniquely identifying the vehicle, which may include, for example, a vehicle identification number (VIN) that may be collected from onboard ECUs, a unique identifier for the telecommunication device 15 use in communications, a certificate (long or short term) given to the vehicle for long-term V2X communication, and so on. The event report message may further include additional information on the geographic location, date, and time of the event occurred, the vehicle model, year of manufacture, manufacturer, and personally identifiable information (PII), e.g., social security number, ID card number, or driver's license number that uniquely identifies individual, i.e., the vehicle owner or driver among others.

The onboard monitoring system 10 may be configured to obtain the update of a set of new EDR rules from the event data management system 20 and apply the new EDR rule set to the EDR 11 and the associated electronic controllers. The associated electronic controllers may include an electronic control unit(s) (e.g., air bag control unit) that provides the EDR 11 with a trigger signal informing the occurrence of an event and/or an electronic control unit(s) that generates data to be recorded by the EDR 11.

The new EDR rule set may be generated (or determined) by the event data management system 20 in response to a change request from a vehicle holder (e.g., the vehicle owner, the lease holder, and so on) or a duly authorized third party. In addition, new EDR rule set may be generated (or determined) based on changes in the law or regulation on the EDR 11. Further, the new EDR rule set may be generated (or determined) based on the current vehicle location (particularly, the country where the vehicle currently resides). The onboard monitoring system 10 may obtain a new EDR rule set by requesting the event data management system 20 for an EDR rule set specific to the country in which the vehicle is located.

The event data management system 20 may be configured to receive event report messages from multiple vehicles. To protect the privacy of individuals, the event data management system 20 may be configured to perform de-identification (or anonymization) processing on the event report message received from the vehicle, and thereby isolate, from the event data, vehicle identification information which would otherwise allow a third party to identify or track the associated vehicle or associated individual and manage the isolated vehicle identification information and event data with different databases, respectively.

The event data management system 20, in response to a request of a service user 30 who desires to use the event data, may provide anonymized event data by which a particular vehicle or person is unable to be identified or provide event data that identifies a particular vehicle or individual. The service user 30 may be a vehicle owner, a driver, an insurance company, a government agency, a researcher, a vehicle manufacturer, or the like, who desires to utilize event data. The event data management system 20 may allow exclusive access by the investigator or other users authorized by the individual vehicle owners, unless otherwise approved by a court order, search warrants and/or the other applicable laws and regulations. The event data management system 20 may be implemented to include a service manager 21, a rules/policy manager 23, a repository coordinator 25, a communication interface 27, and at least one data repository 29.

The service manager 21 is a functional entity in the event data management system, which collects event data from vehicles and manages the same and provides the user with anonymized event data by which a particular vehicle or person unable to be identified or event data that identifies a particular vehicle or individual. The rules/policy manager 23 is a functional entity for managing user profiles, privacy policy, and EDR rules stored in the data repository 29. The repository coordinator 25 is a functional entity for separately storing the EDR data and VII data in the data repository 29 and retrieving the EDR data and VII data from the data repository 29.

The communication interface 27 is a functional entity that serves as a gateway of the event data management system 20. The data repository 29 has databases that record user profiles, privacy policy, EDR rules, event data, and VII data. The user profile includes subscription information of individuals, groups, or organizations that have subscribed to the event data management system 20. The privacy policy includes a set of privacy rules that apply to the collection and management procedures of each vehicle's EDR data. The EDR rules may define the function or operation of the EDR 11 and include a decision criterion for determining the occurrence of at least one event that triggers the recording of event data, data elements that need to be recorded at the event occurrence, or the recording interval/time of each of the data elements.

The rules/policy manager 23 may be configured to receive, from the vehicle owner, privacy settings for the event data collected from the owner's vehicle, and manage the set of privacy rules (i.e., the privacy policy) for application to collection, management and use of the event data according to the privacy settings received. The rules/policy manager 23 may be configured to generate (or determine) a new set of EDR rules to be applied to the onboard EDR 11 in response to a change request from the vehicle owner or an authorized third party. In addition, the rules/policy manager 23 may be configured to generate (or determine) a set of appropriate EDR rules for the country in which the vehicle is currently located. The rules/policy manager 23 may provide the onboard monitoring system 10 with an update of EDR rule set so that the new EDR rule set may be applied to the EDR 11. The update of EDR rule set may be or include the program/software/instructions to be executed by the processor of the processor of the EDR 11 and/or the processor of the associated electronic controller, or reference data to be used by the program/software/instructions, and the like.

The repository coordinator 25 may be configured to perform de-identification (anonymization) processing on the event report message received from the vehicle, and thereby generate anonymized event data by which a third party cannot identify or track the associated vehicle or individual. As described above, the event report message includes event data and vehicle identification information.

The repository coordinator 25 may be divide the information included in the event report message into two data sets. One data set (first data set) contains the event data, but does not include the vehicle identification information, and the other of the data set (second data set) contains the vehicle identification information, but does not include the event data. In other words, separated from the event data is VIN data or any other unique data that allows identifying or tracking the associated vehicle or individual of the event data.

The repository coordinator 25 may be configured to generate a pseudonymous identifier for event data. The generated pseudonymous identifier is used to uniquely identify the relevant event data in the event database. However, that identifier does not contain any meaningful information that allows identifying the vehicle or individual. The repository coordinator 25 may be configured to store the first data set to which the pseudonymous identifier is added, that is, the anonymized event data, in the event database. The repository coordinator 25 may be configured to store a second data set containing the vehicle identification information in the VII database.

In some embodiments, the pseudonymous identifier may be generated by applying a one-way hash algorithm to the vehicle identification information (e.g., VIN data). The one-way hash algorithm makes it impossible to extract vehicle identification information or other useful information from the generated pseudonymous identifier. The pseudonymous identifier may be generated by applying a one-way hash algorithm to the combination of vehicle identification information and a random number. Random numbers used to generate pseudonymous identifiers may be securely managed in a separate database or stored in the VII database along with associated vehicle identification information.

In another embodiment, the pseudonymous identifier may be generated by applying a one-way hash algorithm to the VII index used to uniquely identify the vehicle identification information in the VII database. Particularly, the one-way hash algorithm has been described as an example, but other types of cryptographic algorithms may be used for generating pseudonymous identifiers. Accordingly, the privacy of an individual can be protected by the use of a pseudonymous identifier. The pseudonymous identifier itself does not contain any meaningful information that identifies the vehicle or individual, but the pseudonymous identifier may be (re) generated cryptographically based at least in part on the vehicle identification information stored in the VII database.

Figure 2:
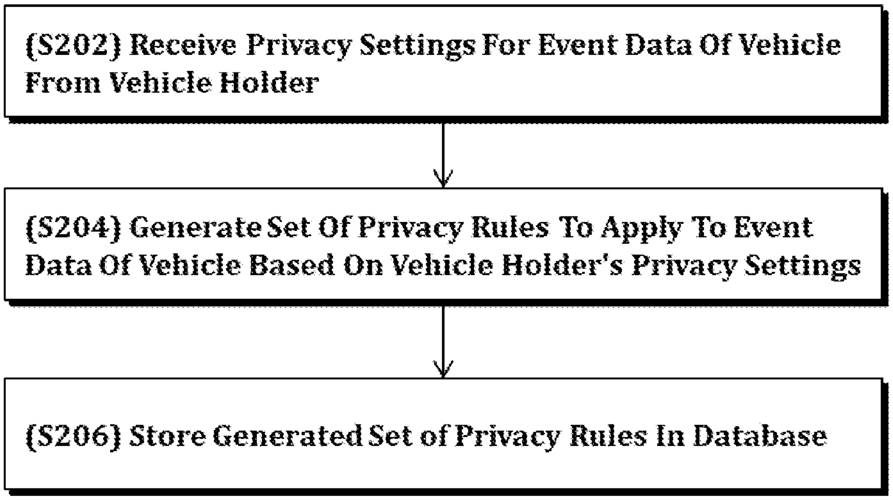
FIG. 2 is a flowchart of a method managing a privacy policy by the event data management system of FIG. 1 in accordance with at least one exemplary embodiment of the present disclosure.

FIG. 2 is a flowchart of a method managing a privacy policy by the event data management system of FIG. 1. The privacy policy includes a set of privacy rules that the event data management system 20 will apply to the collection and management procedures of event data from the respective vehicles.

In Step S202, the rules/policy manager 23 in the event data management system 20 receives the privacy settings for the event data of a vehicle from the vehicle holder. Privacy settings may be made when the vehicle holder registers the vehicle with the event data management system 20 or at some point after registration. The rules/policy manager 23 may provide, through a graphical user interface, a menu for allowing the vehicle holder to choose from a variety of privacy settings for the event data. The privacy settings may include the following options.

Opt-out: an option for the vehicle holder to specify one or more data elements that are not allowed to be collected from the holder's vehicle Opt-in: an option for the vehicle holder to specify one or more data elements that are permitted to be collected from the holder's vehicle Restricted use: an option for the vehicle holder to limit the purposes for which collected data is permitted to be used.

De-identification: an option for the vehicle holder to grant a permission to collect data from the holder's vehicle, but to have any association with the vehicle or individual removed first to permit use of the data by a third party In Step S204, the rules/policy manager 23 generates a set of privacy rules applicable to the event data of the vehicle in accordance with the selection made or input by the vehicle holder. In Step S206, the rules/policy manager 23 stores the generated set of privacy rules in the privacy policy-related database. The set of privacy rules may be defined in the database in a markup language such as Extensible Markup Language (XML).

Figure 3:
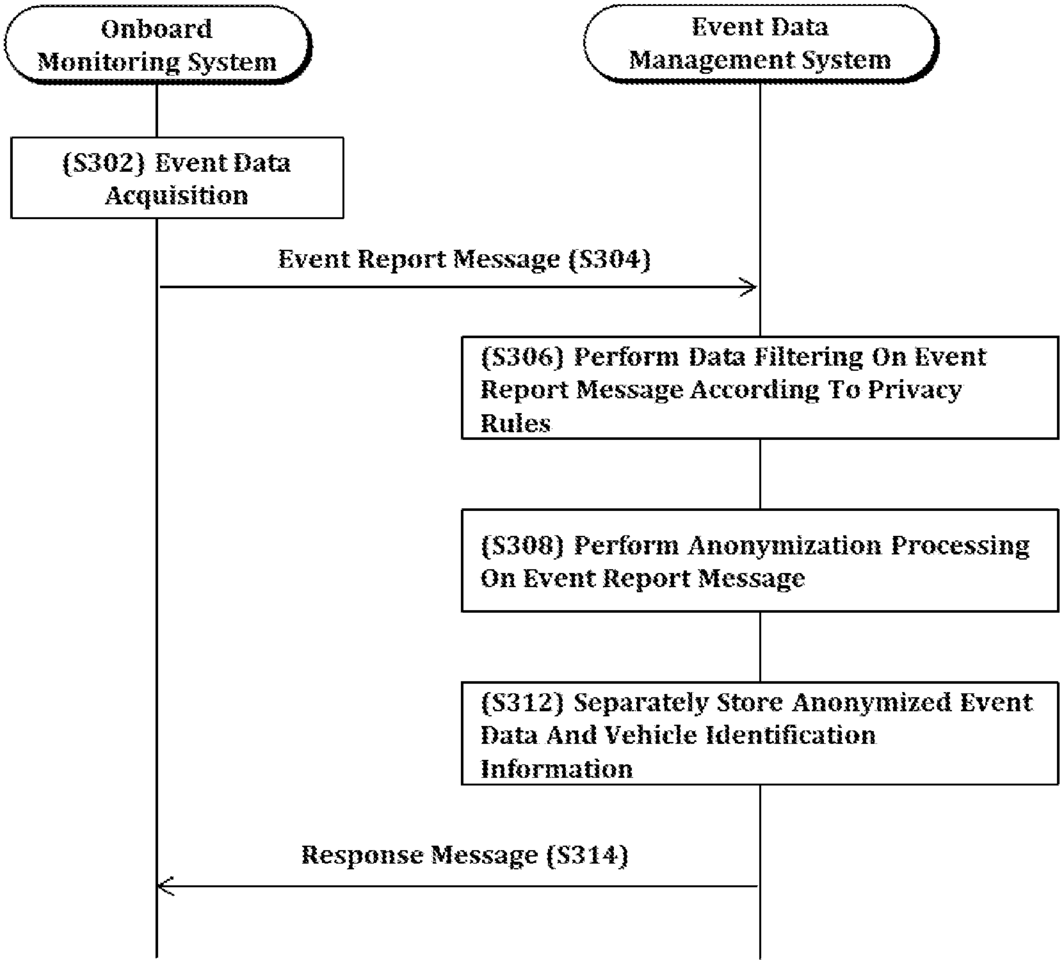
FIG. 3 is a flowchart of a process performed by the system shown in FIG. 1 for collecting event data in accordance with at least one exemplary embodiment of the present disclosure.

FIG. 3 is a flowchart of a process performed by the system shown in FIG. 1 for collecting event data. In Step S302, the telecommunication device 15 of the onboard monitoring system 10 obtains the event data from at least one module including the EDR 11, ECU, component, program, or the like. For example, the telecommunication device 15 may receive, from the EDR 11, the EDR data recorded when triggered at the occurrence of an event, and may additionally collect the geographic location, date, time and so on where and when the event occurred.

In Step S304, the telecommunication device 15 generates an event report message and wirelessly transmits the generated event report message to the event data management system 20 in the network. The event report message may include event data and vehicle identification information. The event report message may further include additional information such as geographic location, date and time of the event occurred, vehicle model, year of manufacture, manufacturer, owner or driver identification information and so on.

In Step S306, the repository coordinator 25 in the event data management system 20 obtains the privacy rules relating to the vehicle from the privacy policy-related database of the data repository 29. In accordance with privacy rules, the repository coordinator 25 may be configured to perform preprocessing (i.e., perform data filtering) on the event report message such as extracting items that are allowed to be collected from the event report message received from the vehicle or removing data that is not permitted to be collected.

In Step S308, the repository coordinator 25 performs anonymization (de-identification) processing on the preprocessed event report message to generate anonymized event data by which a third party is unable to identify or track the associated vehicle or individual. As described above, the event report message includes event data and vehicle identification information. The repository coordinator 25 may divide the information items contained in an event report message into at least two data sets. One data set (first data set) contains the event data, but does not contain the vehicle identification information, and the other of the data set (second data set) contains the vehicle identification information, but does not contain event data. At least some items of the aforementioned additional information may be included in the first data set. The repository coordinator 25 may be configured to generate a pseudonymous identifier for the event data.

In Step S310, the repository coordinator 25 may be configured to store the first data set with the pseudonymous identifier added, that is, anonymized event data in a first database. The anonymized event data may be or include event data identified by a pseudonymous identifier. In Step S312, the repository coordinator 25 may be configured to store the second data set that contains the vehicle identification information to a second database. If the pseudonymous identifier was generated by applying the one-way hash algorithm to the combination of the vehicle identification information and the random number, the repository coordinator 25 may be configured to store the random number used to generate the pseudonymous identifier along with the vehicle identification information in the second database.

In Step S314, the event data management system 20 may be configured to transmit to the onboard monitoring system 10, a response message indicating the success or failure with the storing of the event data. On the other hand, as noted in the BACKGROUND section, according to the conventional EDR, data of minor incidents that do not meet the preset trigger worthy conditions of event are not permanently written to the non-volatile memory but rather overwritten with new data in the volatile memory. Although even such minor incidents account for a significant portion of the overall insured accidents, such EDR data recording methods as above due to limited storage space make it difficult to allow the investigators utilize the EDR data related to a minor incident. The present centralized system for collecting and managing EDR data from vehicles liberate the onboard EDRs from such constraints by storage space. This provides the EDR the opportunity of using more trigger conditions to collect EDR data related to minor incidents and collecting more data elements to facilitate post-event analysis of the event.

Figure 4:
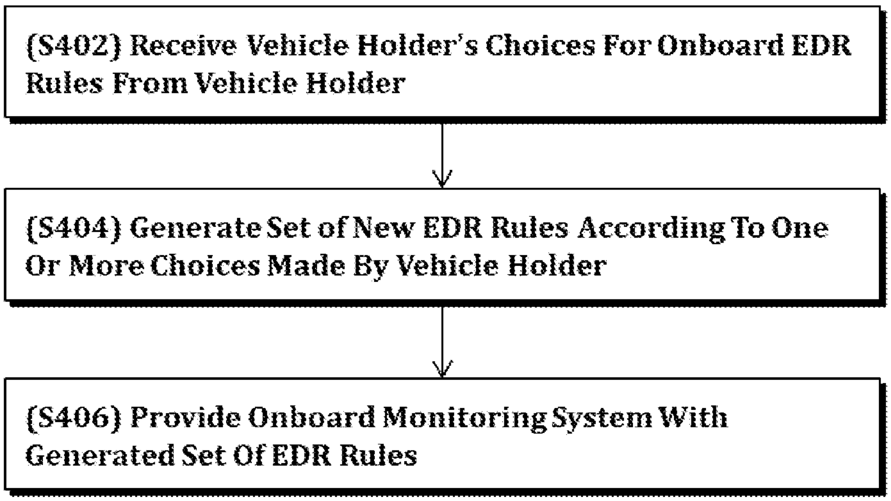
FIG. 4 is a flowchart of a method performed by the system of FIG. 1 for applying new EDR rules according to the setting of the vehicle owner to an onboard monitoring system in accordance with at least one exemplary embodiment of the present disclosure.

FIG. 4 is a flowchart of a method performed by the system of FIG. 1 for applying new EDR rules according to the setting of the vehicle owner to an onboard monitoring system. In Step S402, the rules/policy manager 23 of the event data management system 20 receives an update request for EDR rules of the relevant vehicle from a requestor (who may typically be the vehicle holder). The rules/policy manager 23 may be configured to determine, based on the user profiles stored in the data repository 29, whether the requestor is a duly authorized one. EDR rules are rules that prescribe the function or operation of the EDR 11. The update request may be a request for modification, deletion, addition or other adjustments of a decision criterion or trigger condition for determining an occurrence of at least one event triggering storing of EDR data, for such adjustments of the data elements to be recorded at the occurrence of an event, or for such adjustments of at least recording interval/time of the respective elements.

The rules/policy manager 23 may provide, through a graphical user interface, a menu for allowing the vehicle holder to select from a variety of settings for the EDR rule. The vehicle holder may select certain trigger conditions under which the onboard EDR 11 is urged to record/upload data, select certain data elements to record/upload, or select others. In addition to mandatory trigger conditions (e.g., occurrence of acceleration or deceleration in excess of a predefined threshold) to employ by law or regulation, the vehicle holder may set new trigger conditions (e.g., occurrence of acceleration or deceleration in excess of a reduced threshold from the predefined threshold). In addition, besides mandatory data elements to record by law or regulation, the vehicle holder may set additional data elements.

In Step S404, the rules/policy manager 23 may be configured to record one or more selections input by the vehicle holder in the associated database and generate a set of new EDR rules applicable to the onboard EDR 11 in accordance with the recorded selections. In Step S406, the rules/policy manager 23 provides the onboard monitoring system 10 with an update of the generated set of EDR rules. For example, the rules/policy manager 23 may be configured to register an update of the EDR rule set with an OTA server (not shown) and inform the onboard monitoring system 10 of the presence of the update. The onboard monitoring system 10 may be configured to obtain the update of the EDR rule set and apply the new EDR rule set to the EDR 11 and/or the associated electronic controllers. The update of the EDR rule set may be or include the software/instructions to be executed by the processor of the processor of the EDR 11 and/or the processor of the associated electronic controllers, or reference data to be used by the software/instructions, and the like.

Thereafter, the event data management system 20 may be configured to receive the event data recorded by the EDR 11 based on the new EDR rules. The event data may include a unique identifier assigned to the trigger signal that triggered the recording. The event data management system 20 may be configured to classify the event data by each set of EDR rules applied and store the classified data in a database in the data repository 29. For example, the event data management system 20 may be configured to classify the event data for each version of set of EDR rules or for each trigger condition and store the classified data in a database. In addition, the event data management system 20 may be configured to store data elements in a database by separating the data elements for which recording is up to options by the vehicle holder from the data elements for which recording is mandated by law or regulation.

EDR data for the trigger condition mandated by law or regulation may be permanently stored, even after the transmission is completed to the event data management system 20, in the EDR 11 at a non-volatile memory so that it is unable to be deleted or altered. On the other hand, once the transmission is completed to the event data management system 20, EDR data for the trigger condition as added by the user may be automatically removed from the non-volatile memory in the EDR 11 or be overwritten with new EDR data. Likewise, the data elements mandated by law or regulation and the data elements for which recording is up to options by the vehicle holder may be similarly processed.

On the other hand, laws or regulations that apply to vehicle EDRs may vary from country to country. For example, there may be different stipulated decision criteria by different countries for determining the occurrence of event(s) that triggers EDRs to record event data, and different stipulated data elements or different stipulated recording intervals/times of the respective elements by different countries, which need to be recorded at the occurrence of event. In addition, due to differences in individual privacy policies, information that may be collected in one country may not be allowed in another. According to at least one aspect of the present disclosure, the onboard monitoring system 10 may obtain, from the event data management system 20, the update of a new EDR rule set suitable to the country where the vehicle resides, and thereby apply the new EDR rule set to the EDR 11 and/or the associated electronic controllers.

Figure 5:
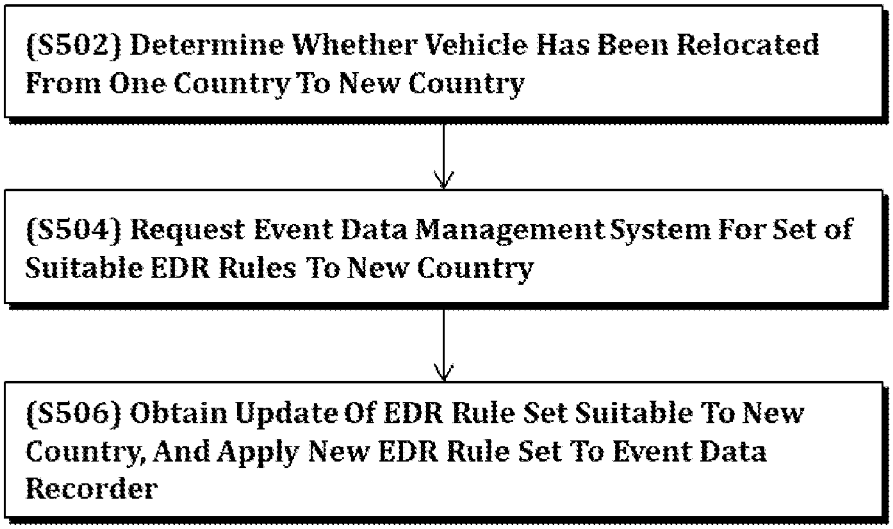
FIG. 5 is a flowchart of a method of the system of FIG. 1 applying an EDR rule set specific to the location of the vehicle to the EDR in accordance with at least one exemplary embodiment of the present disclosure.

FIG. 5 is a flowchart of a method of the system of FIG. 1 applying an EDR rule set specific to the location of the vehicle to the EDR. In Step 502, the onboard monitoring system 10 determines whether the vehicle has been relocated between two locations resulting in a relocation from one country to a new country. The onboard monitoring system 10 may be configured to determine the current location of the vehicle and the country in which the vehicle is currently located by receiving the current location of the vehicle from its positioning device.

In Step 504, the onboard monitoring system 10 transmits the event data management system 20 a request message for requesting a set of suitable EDR rules to a new country. The request message may include a vehicle identifier and information on the current location of the vehicle or the country where the vehicle currently resides. After Step 504 and before Step 506, the rules/policy manager 23 of the event data management system 20 searches the databases in the data repository 29 to obtain a set of EDR rules. The rules/policy manager 23 may be configured to register an update of the set of rules with an OTA server (not shown) and inform the onboard monitoring system 10 of the presence of that update. In Step 506, the onboard monitoring system 10 may be configured to obtain the update of a set of suitable EDR rules to the new country and apply the new set of EDR rules to the EDR 11 and/or the associated electronic controllers.

It should be understood that the illustrative embodiments described above may be implemented in many different ways. In some embodiments, the various methods, devices, servers, (sub)system described in this disclosure may be implemented by at least one general purpose computer having processors, memories, disks or other mass storage, communication interfaces, input/output (I/O) devices and other peripheral devices. The general purpose computer may serve as an apparatus, server, or system adapted to load software instructions on the processor, and then execute the instructions to perform the functions described in this disclosure, and thereby perform the methods described above.

Meanwhile, the various methods described in this disclosure may be implemented with instructions stored on a non-transitory recording medium that can be read and executed by one or more processors. Non-transitory recording medium includes, for example, any type of recording device in which data is stored in a form readable by a computer system. For example, non-transitory recording medium includes storage media such as erasable programmable read only memory (EPROM), electrically erasable programmable read-only memory (EEPROM), flash drives, optical drives, magnetic hard drives, and solid state drives (SSDs).

Although exemplary embodiments of the present disclosure have been described for illustrative purposes, those skilled in the art will appreciate that various modifications, additions and substitutions are possible, without departing from the various characteristics of the disclosure. Therefore, exemplary embodiments of the present disclosure have been described for the sake of brevity and clarity. Accordingly, one of ordinary skill would understand the scope of the disclosure is not limited by the above explicitly described embodiments but by the claims and equivalents thereof.

What is claimed is:

1. A method for collecting and managing event data from at least one vehicle, comprising:

implementing an event data management system by at least one network server, the event data management system being operably connected via a network to an onboard monitoring system of the vehicle and to a service user located outside of the vehicle;

mounting an event data recorder (EDR) in the vehicle for recording the event data obtained by at least one sensor in the vehicle, wherein operation of the EDR is governed by at least one EDR rule that determines whether or not to record the event data;

receiving, from the service user, an update request for adjusting a setting of the at least one EDR rule by changing a trigger condition of at least one event that triggers the EDR to record the event data;

generating at least one modified EDR rule in which the trigger condition is changed for recording the event data by the EDR and an associated electronic controller of the vehicle based on the update request; and providing the vehicle with an update of the at least one modified EDR rule.

2. The method of claim 1, wherein the update request includes:

a request for changing, deleting or adding a decision criteria to determine an occurrence of the at least one event that triggers the EDR to record the event data.

3. The method of claim 2, wherein the modified EDR rule includes:

a first decision criterion mandated by a law or a regulation; and a second decision criterion, different from the first decision criterion, added by a setting of the service user.

4. The method of claim 1, wherein the modified EDR rule includes:

a rule that defines data elements to be recorded in response to an occurrence of the at least one event, the data elements including a first element mandated by a law or a regulation and a second element added by a setting of the service user.

5. The method of claim 1, wherein the associated electronic controller comprises:

an electronic controller configured to provide the EDR with a trigger signal providing a notification regarding an occurrence of the at least one event, or an electronic controller configured to generate data to be recorded by the EDR.

6. The method of claim 1, further comprising:

receiving an event data record made based on the modified EDR rule by the EDR mounted within the vehicle; and storing the event data record in a database.

7. The method of claim 6, wherein the event data record when stored is classified by EDR rules or the trigger condition applied to making of the event data record.

8. A system for collecting and managing event data from at least one vehicle of a plurality of vehicles, the system comprising:

the system being operably connected via a network to an onboard monitoring system of the vehicle and to a service user located outside of the vehicle;

an event data recorder (EDR) mounted in the vehicle for recording the event data obtained by at least one sensor in the vehicle, wherein operation of the EDR is governed by at least one EDR rule that determines whether or not to record the event data;

a controller configured to receive from the service user an update request for adjusting a setting of the at least one EDR rule by changing a trigger condition of at least one event that triggers the EDR to record the event data;

the controller configured to generate at least one modified EDR rule in which the trigger condition is changed for recording the event data that is suitable for the EDR and an associated electronic controller of the vehicle based on the update request; and the controller configured to provide each of the vehicles with an update of the modified EDR rule.

9. The system of claim 8, wherein the update request includes:

a request for changing, deleting or adding decision criteria to determine an occurrence of the at least one event that triggers the EDR to record the event data.

10. The system of claim 9, wherein the modified EDR rule includes:

a first decision criterion mandated by a law or a regulation; and a second decision criterion, different from the first decision criterion, added by a setting of the service user.

11. A system of claim 8, wherein the modified EDR rule includes:

a rule that defines data elements to be recorded when an event occurs, the data elements including a first element mandated by a law or a regulation and a second element added by a setting of the service user.

12. The system of claim 8, wherein the associated electronic controller comprises:

an electronic controller configured to provide the EDR with the trigger signal informing an occurrence of the at least one event, or an electronic controller configured to generate data to be recorded by the EDR.

13. The system of claim 8, further comprising:

a controller configured to receive an event data record made based on the modified EDR rule by the EDR mounted on each of the vehicles; and a controller configured to store the event data record in a database.

14. The system of claim 13, wherein the event data record when stored is classified by EDR rules or the trigger condition applied to making of the event data record.

15. A method of operating at least one vehicle having an event data recorder (EDR), comprising:

providing an onboard monitoring system in the vehicle being operably connected via a network to an event data management system implemented by at least one network server and to a service user located outside of the vehicle;

the event data recorder (EDR) mounted in the vehicle for recording the event data obtained by at least one sensor in the vehicle, wherein operation of the EDR is governed by at least one EDR rule that determines whether or not to record the event data;

receiving, from the service user, an update request for adjusting a setting of the at least one EDR rule suitable for a country in which the at least one vehicle is located by changing a trigger condition of at least one event that triggers the EDR to record the event data; and generating at least one modified EDR rule in which the trigger condition is changed for recording the event data by the EDR and an associated electronic controller of the vehicle based on the update request; and providing the vehicle with an update of the at least one modified EDR rule.

16. The method of claim 15, further comprising:

determining whether the at least one vehicle is relocated from the country to a new country.

17. The method of claim 15, wherein the receiving includes:

informing the event data management system of a current location of the vehicle or the country in which the vehicle is currently located.

18. The method of claim 15, wherein the at least one EDR rule includes:

a decision criterion for determining an occurrence of the at least one event triggering the EDR to record the event data.

19. The method of claim 15, wherein the at least one EDR rule includes:

a rule that defines data elements to be recorded in response to an occurrence of the at least one event.

20. An onboard monitoring system of a vehicle having an event data recorder (EDR), comprising:

the onboard monitoring system being operably connected via a network to an event data management system implemented by at least one network server and to a service user located outside of the vehicle;

the event data recorder (EDR) mounted in the vehicle for recording the event data obtained by at least one sensor in the vehicle, wherein operation of the EDR is governed by at least one EDR rule that determines whether or not to record the event data;

a controller configured to receive from the service user an update request the event data management system for adjusting a setting of the at least one EDR rule suitable for a country in which the vehicle is located by changing a trigger condition of at least one event that triggers the EDR to record the event data; and the controller configured to generate at least one modified EDR rule in which the trigger condition is changed for recording the event data that is suitable for the country in which the vehicle is located, and to apply the at least one EDR rule to the EDR and an associated electronic controller.

* * * * *